June 27, 1933.  S. WEBB  1,915,705

CHUCK

Filed July 23, 1932   2 Sheets-Sheet 1

Inventor:
SAMUEL WEBB,
by Usina & Rauber
his Attorneys.

June 27, 1933.  S. WEBB  1,915,705
CHUCK
Filed July 23, 1932  2 Sheets-Sheet 2

Inventor:
SAMUEL WEBB,
by: Usina & Rauber
his Attorneys.

Patented June 27, 1933

1,915,705

UNITED STATES PATENT OFFICE

SAMUEL WEBB, OF PITTSBURGH, PENNSYLVANIA, ASSIGNOR TO NATIONAL TUBE COMPANY, A CORPORATION OF NEW JERSEY

CHUCK

Application filed July 23, 1932. Serial No. 624,311.

This invention relates to chucks, one of the objects being a quick engagement and releasal of work by little effort on the part of an operator. It is particularly intended to engage circular objects such as tubes and pipes and may be incorporated with various machines used in their manufacture. Such machines may be those cutting crop ends, reaming and chamfering, screwing on or off couplings and the like.

A chuck constructed in accordance with this invention is characterized by an annular body which carries inwardly swinging work-piece grippers and some sort of means for swinging them. These elements rotate together and the work to be engaged is passed therethrough. Then suitable stationary means selectively engage the gripper-swinging means to throw the grippers into engaging positions.

Preferably this annular body is removably fixed in the bore of a rotary member so that it may be removed and others of different inner diameters substituted at will. Also, the gripper swinging means preferably consists of a cylindrical part having slots through which the grippers project and capable of a slight individual movement whereby the latter may be swung in and out of work engaging positions. A drum may be provided which turns with this cylindrical part and whose motion may be retarded by a suitably arranged stationary brake.

If the chuck is to release the work without ceasing its rotary motion a second drum may be provided near the first and interconnected therewith by pinions intermeshing rack portions cut in the adjacent edges of each. Then, by providing a second brake for this second drum, it is possible to give the first a rotative motion in excess of that of the chuck as a whole so that the grippers are flipped out of engagement with the work. These bands may be suitably interconnected for alternate selective application.

Having reference to the accompanying drawings which illustrate the invention in what is at present considered its preferred form—

Figure 1:
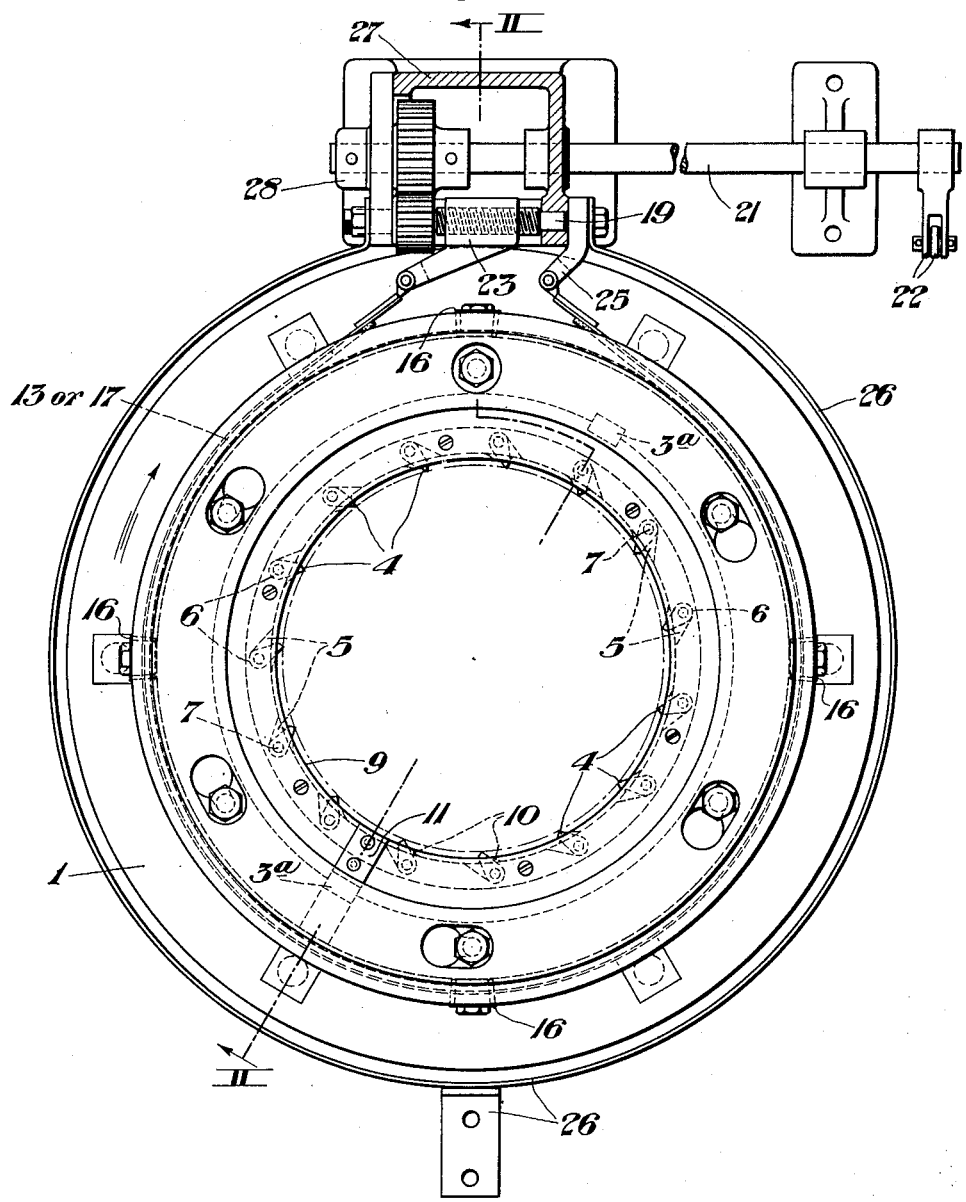

Figure 1 is a front plan.

Figure 2:
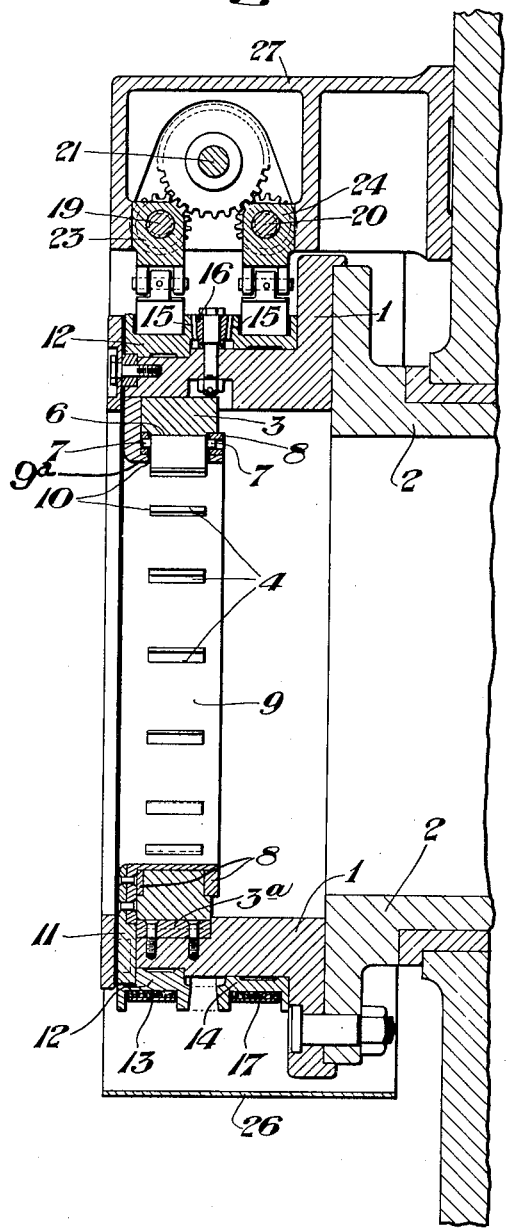

Figure 2 a cross-section from the line II—II in Figure 1, and

Figure 3:
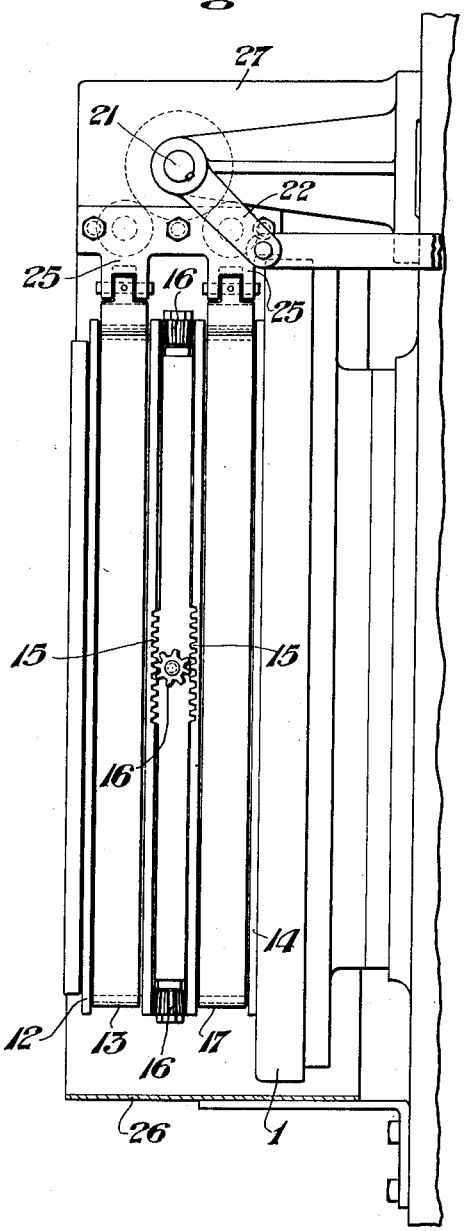

Figure 3 a side elevation.

These drawings show the rotary member 1 bolted to a driving element 2. The actual means for driving this is not shown as it is not a part of the present invention. Ordinarily it may be accomplished by an encircling ring gear meshed with a motor driven pinion. The member 1 is bored to receive the work and is counter-bored at its end remote from the element 2 for the reception of the annular body 3.

This body 3 carries work-piece grippers 4 which swing radially inwardly in slots 5. These slots angle in the rotating direction which gives the grippers a toggle action causing them to grip more firmly as the load increases.

The grippers 4 and the slots 5 have circular co-acting bearing surfaces 6 which enable a better distribution of the turning forces between the two. To facilitate renewal, the grippers have pivotal mounting lugs 7 which engage holes in retaining rings 8 which are suitably bolted in place.

Keys 3$^a$ hold the annular member 3 from rotating in the counter-bore of the rotary member 1. The swinging means for the grippers consists of a cylindrical part 9 constructed with a retaining flange 9$^a$ and slots 10. The grippers project through these slots, and by rotating the cylindrical part slightly with respect to the annular body 3 the desired control is effected. A lug 11 is fixed to the outer edge of the cylindrical part 9, projects through a slot in the annular body 3 and rotary member 1 and terminates beyond the outside of the latter.

A drum 12 slidingly encircles this outside and is fixed to the lug 11. A brake band 13 is around this drum and when momentarily tightened will retard the latter's rotary motion so that it turns slightly on the rotary member 1. This causes the cylindrical part 9 to turn slightly with respect to the annular body 3 and swings the grippers 4 into workpiece engaging position.

A chuck constructed as so far described will also release if it is possible to reverse the driving element 2. That is to say, when releasal is desired it is necessary to reverse the rotating direction of the chuck and momentarily grip the drum 12. However, this operation is not always desirable especially when the chuck is used with the heavier types of machinery.

In order to release the grippers 4, without the necessity of reversing the rotation of the chuck, a means is provided for turning the cylindrical part 9 in the same direction it would if retarded while the chuck's rotation was reversed.

This includes a second drum 14 which slidingly encircles the rotary member 1 adjacent the first drum 12. The adjacent edges of both are provided with rack portions 15 which mesh common pinions 16 mounted on the rotary member. A second brake band 17 encircles this second drum and when tightened retards it. This causes a partial rotation of the pinion 16 which drives the drum 12 faster than the rotative speed of the chuck as a whole and gives the cylindrical part 9 the motion necessary to throw the grippers 4 out of engagement with the work-piece.

The means for alternately selectively tightening one or the other of the bands 13 and 17 consists of parallel shafts 19 and 20 both geared to a third shaft 21 for simultaneous rotation thereby. This third shaft may be manually turned by a hand lever 22 or by suitable power means. The shafts 19 and 20 are constructed with oppositely pitched screw threads which respectively engage nuts 23 and 24.

In each instance the bands 13 and 17 have one of their ends fixedly positioned by stationary brackets 25. The free end of the band 13 is fixed to the nut 23 and the free end of the band 17 is fixed to the nut 24. As these nuts are driven by oppositely pitched screws, which are synchronously driven by the shaft 21 when turned by the lever 22, it is possible to alternately tighten the bands. When the lever 22 is in an intermediate position both bands are loose. When it is thrown in either direction, one or the other of the bands is tightened and the grippers are thrown into or out of engaging position. This secures the desired engagement or releasal while allowing the chuck to continuously turn in one direction.

It is to be understood that the bands 13 and 17 and their tightening and loosening machinery do not rotate with the chuck proper but are mounted by a stationary annular bracket 26. The gearing elements are mounted in a housing 27, the threaded shafts 19 and 20 having squared ends which project therethrough. The shaft 21 is secured in this housing by a pinned collar 28 which when removed allows the shaft 21 to be pulled so that the gears between it and the screw threaded shafts are unmeshed. It is then possible to individually adjust the relative positions of the nuts on these threaded shafts by individual rotation of the latter's squared ends.

This specific form has been illustrated and described in accordance with the patent statutes, and is not intended to limit the invention except as defined by the following claims.

I claim:

1. The combination of a rotary member having a bore and counter-bore with the latter mounting an annular body carrying inwardly swinging grippers and a cylindrical part having slots through which these grippers project, a drum rotatively interconnected with said cylindrical part, a second drum adjacent said first named drum, rack portions on the adjacent edges of said drums, pinions meshed with said rack portions on each of said drums and interconnecting the two for mutual opposite rotation and stationary brakes for said drums.

2. The combination of a rotary member having a bore and counter-bore with the latter mounting an annular body carrying inwardly swinging grippers and a cylindrical part having slots through which these grippers project, a drum rotatively interconnected with said cylindrical part, a second drum adjacent said first named drum, rack portions on the adjacent edges of said drums, pinions meshed with said rack portions on each of said drums and interconnecting the two for mutual opposite rotation, brake bands loosely encircling said drums and arranged in each instance with a stationarily fixed end, a pair of oppositely threaded shafts arranged adjacent said bands, nuts engaging said shafts and fixed to the free ends of said bands, and means for simultaneously rotating said shafts.

3. The combination of a rotary member having a bore and counter-bore with the latter mounting an annular body carrying inwardly swinging grippers and a cylindrical part having slots through which these grippers project, a drum rotatively interconnected with said cylindrical part, a second drum adjacent said first named drum, rack portions on the adjacent edges of said drums, pinions meshed with said rack portions on each of said drums and interconnecting the two for mutual opposite rotation, brake bands loosely encircling said drums and arranged in each instance with a stationarily fixed end, a pair of oppositely threaded shafts arranged adjacent said bands, nuts engaging said shafts and fixed to the free ends of said bands, pinions on each of said shafts, a gear arranged to be moved into and out of mesh with said pinions, and means for turning said gear.

4. The combination of a rotary member having a work receiving opening, a work gripping means mounted in said opening and including a reciprocative operating part, a drum connected to said part, a second drum adjacent said first named drum, rack portions on the adjacent edges of said drums, pinions meshing with said rack portions on each of said drums and brakes for said drums.

In testimony whereof, I have hereunto set my hand.

SAMUEL WEBB.